United States Patent
Kim

(10) Patent No.: US 8,795,881 B2
(45) Date of Patent: Aug. 5, 2014

(54) TERMINAL OF RECHARGEABLE BATTERY, METHOD OF ASSEMBLING THE TERMINAL OF RECHARGEABLE BATTERY, RECHARGEABLE BATTERY MODULE AND METHOD OF ASSEMBLING THE RECHARGEABLE BATTERY MODULE

(75) Inventor: Dukjung Kim, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 335 days.

(21) Appl. No.: 13/067,358

(22) Filed: May 26, 2011

(65) Prior Publication Data

US 2012/0121966 A1 May 17, 2012

(30) Foreign Application Priority Data

Nov. 12, 2010 (KR) .................. 10-2010-0112666

(51) Int. Cl.
*H01M 2/02* (2006.01)
*H01M 2/24* (2006.01)
*H01M 6/42* (2006.01)
*H01M 2/00* (2006.01)

(52) U.S. Cl.
USPC .............................. 429/179; 429/158; 429/65

(58) Field of Classification Search
CPC ............ H01M 2/30; H01M 2/02; H01M 2/06
USPC ............ 429/178–182, 158, 175, 65; 439/801, 439/709, 755
See application file for complete search history.

(56) References Cited

U.S. PATENT DOCUMENTS

| | | | |
|---|---|---|---|
| 4,179,545 A | 12/1979 | Ciliberti | |
| 4,936,799 A * | 6/1990 | Woodall | 439/755 |
| 5,856,041 A | 1/1999 | Inoue et al. | |
| 2001/0005658 A1 * | 6/2001 | Matsuda et al. | 439/801 |
| 2009/0186269 A1 * | 7/2009 | Kim et al. | 429/179 |
| 2010/0233915 A1 | 9/2010 | Kim | |
| 2010/0239897 A1 | 9/2010 | Sumihara et al. | |
| 2011/0183193 A1 * | 7/2011 | Byun et al. | 429/178 |
| 2012/0100420 A1 * | 4/2012 | Byun et al. | 429/179 |

FOREIGN PATENT DOCUMENTS

| | | |
|---|---|---|
| JP | 2002-203536 | 7/2002 |
| JP | 2005-122911 | 5/2005 |
| JP | 2009-289732 | 12/2009 |
| KR | 20-1997-047054 | 7/1997 |
| KR | 1998-062029 A | 10/1998 |
| KR | 10-1999-0053305 A | 7/1999 |
| KR | 2010-0105340 | 9/2010 |

OTHER PUBLICATIONS

Korean Notice of Allowance dated Oct. 31, 2012.

* cited by examiner

*Primary Examiner* — Patrick Ryan
*Assistant Examiner* — Kiran Quraishi
(74) *Attorney, Agent, or Firm* — Lee & Morse, P.C.

(57) ABSTRACT

A terminal of a rechargeable battery having a case and an electrode assembly inside the case includes a current collecting terminal electrically connectable to the electrode assembly inside the case and for protrusion outwardly from the case, a terminal plate for positioning outside the case, the terminal plate being coupled to the current collecting terminal, and a contact spring for positioning between the outside of the case and the terminal plate, the contact spring being coupled to the current collecting terminal, the contact spring having a predetermined region extending through the terminal plate.

20 Claims, 9 Drawing Sheets

TERMINAL OF RECHARGEABLE BATTERY, METHOD OF ASSEMBLING THE TERMINAL OF RECHARGEABLE BATTERY, RECHARGEABLE BATTERY MODULE AND METHOD OF ASSEMBLING THE RECHARGEABLE BATTERY MODULE

BACKGROUND

1. Field

Embodiments relate to a terminal of a rechargeable battery, a method of assembling the terminal of a rechargeable battery, a rechargeable battery module and a method of assembling the rechargeable battery module.

2. Description of the Related Art

In general, rechargeable batteries can be repeatedly charged and discharged, unlike primary batteries, which are incapable of being recharged. Low capacity rechargeable batteries composed of a single cell are generally used for portable small electronic devices, such as mobile phones, camcorders, or the like. Large capacity rechargeable batteries composed of a plurality of cells connected in a form of a pack are widely used to drive motors of electric scooters, hybrid vehicles, electric vehicles, or the like.

A rechargeable battery may be manufactured in various forms. Representative forms of a rechargeable battery include a cylindrical form or a prismatic form. A typical rechargeable battery includes an electrode assembly having a positive electrode and a negative electrode with a separator interposed therebetween, a case that provides a space to house the electrode assembly with an electrolyte, and a cap plate installed at the case. The positive electrode terminal and a negative electrode terminal are connected to the electrode assembly and are exposed or protrude outwardly through the cap plate.

SUMMARY

According to an embodiment, there is provided a terminal of a rechargeable battery having a case and an electrode assembly inside the case, the terminal including a current collecting terminal electrically connectable to the electrode assembly inside the case and for protrusion outwardly from the case, a terminal plate for positioning outside the case, the terminal plate being coupled to the current collecting terminal, and a contact spring for positioning between the outside of the case and the terminal plate, the contact spring being coupled to the current collecting terminal, the contact spring having a predetermined region extending through the terminal plate.

The current collecting terminal may pass through the contract spring and the terminal plate and may be riveted to the terminal plate.

The current collecting terminal and the terminal plate may be integrally formed.

The terminal plate may include a terminal body including a terminal throughhole through which the current collecting terminal passes, a spring throughhole spaced apart from the terminal throughhole through which the contact spring passes, and a fastening groove on a bottom surface of the terminal body to which the contact spring is coupled, and an upwardly extending sidewall portion formed at a periphery of the terminal body.

The contact spring may include a horizontal support portion coupled and fixed to the fastening groove of the first terminal plate in a horizontal direction, a vertical bent portion extending upwardly and vertically bent from the horizontal support portion and passing through the spring throughhole for coupling, a tilted bent portion extending from the vertical bent portion and upwardly bent from the spring throughhole in a tilted manner, and an annular portion extending from the tilted bent portion, forming a substantially oval shape within the terminal plate.

The contact spring may have a terminal hole through which the current collecting terminal passes.

A pair of the contact springs may be formed to be symmetrical at substantially opposite sides of the terminal throughhole of the terminal body.

The contact spring may be made of any one of phosphor bronze, beryllium copper, and yellow brass.

A top surface of the annular portion of the contact spring may be lower than a top surface of the terminal plate.

In a secondary battery having the terminal, an insulation member may be interposed between the terminal plate and the case.

According to another embodiment, there is provided a method of assembling a terminal of a rechargeable battery including coupling a terminal plate to a current collecting terminal protruding outwardly from the case and riveting the current collecting terminal to the terminal plate, and coupling a contact spring having a predetermined region passing through the terminal plate to the current collecting terminal between the outside of the case and the terminal plate.

According to another embodiment, there is provided a method of assembling a terminal of a rechargeable battery including providing a terminal plate coupled to a current collecting terminal, the current collecting terminal protruding outwardly from the case and the terminal plate and the current collecting terminal being integrally formed; and coupling a contact spring to the current collecting terminal between the outside of the case and the terminal plate, the contact spring having a predetermined region passing through the terminal plate.

According to another embodiment, there is provided a rechargeable battery module having a plurality of rechargeable batteries positioned in parallel with each other to be electrically connected to each other, wherein, each of the plurality of rechargeable batteries includes at least one terminal including a current collecting terminal electrically connected to an electrode assembly inside a case and protruding outwardly from the case, a terminal plate positioned outside the case and coupled to the current collecting terminal, and contact springs positioned between the outside of the case and the terminal plate and coupled to the current collecting terminal, the contact springs each having a predetermined region extending through the terminal plate, and a bus bar connects one current collecting terminal of one of the plurality of rechargeable batteries to another current collecting terminal of an adjacent rechargeable battery, the bus bar insertably engaging the contact spring positioned in the terminal plate.

The bus bar may include a fastening hole at the terminal of the rechargeable battery or at a region between the terminal of the rechargeable battery and another terminal of an adjacent rechargeable battery, a fastening groove outside of the case, corresponding to the fastening hole, and a bolt portion engaged with the fastening hole through the fastening groove to couple the bus bar fixedly to the fastening groove.

The bus bar may be coupled to portions of the contact springs passing through the terminal plate by an interference fit.

The bus bar may include a throughhole through which the current collecting terminal passes, and the current collecting terminal passing through the throughhole may be riveted to the bus bar.

According to another embodiment, there is provided a method of assembling a rechargeable battery module having a plurality of unit rechargeable batteries positioned in parallel with each other to be electrically connected to each other, the method including providing the plurality of unit rechargeable batteries such that each of the plurality of rechargeable batteries includes at least one terminal including a current collecting terminal electrically connected to an electrode assembly inside a case and protruding outwardly from the case, a terminal plate positioned outside the case and coupled to the current collecting terminal, and contact springs positioned between the outside of the case and the terminal plate and coupled to the current collecting terminal, the contact springs each having a predetermined region extending through the terminal plate, connecting a current collecting terminal of the rechargeable battery and another current collecting terminal of an adjacent rechargeable battery through a bus bar, wherein the bus bar is inserted between the contact springs.

The bus bar may include at least one fastening hole at the terminal of the rechargeable battery or at a region between the terminal of the rechargeable battery and another terminal of an adjacent rechargeable battery; a fastening groove outside of the case, corresponding to the fastening hole; and a bolt portion engaged with the fastening hole through the fastening groove to couple the bus bar fixedly to the fastening groove.

The bus bar may have predetermined bus bar regions coupled to portions of the contact springs passing through the terminal plate by an interference fit.

The bus bar may include a throughhole through which the current collecting terminal passes, and the current collecting terminal passing through the throughhole is riveted to the bus bar.

Additional aspects will be set forth in part in the description which follows and, in part, will be obvious from the description, or may be learned by practice of the invention.

DETAILED DESCRIPTION

Figure 1:
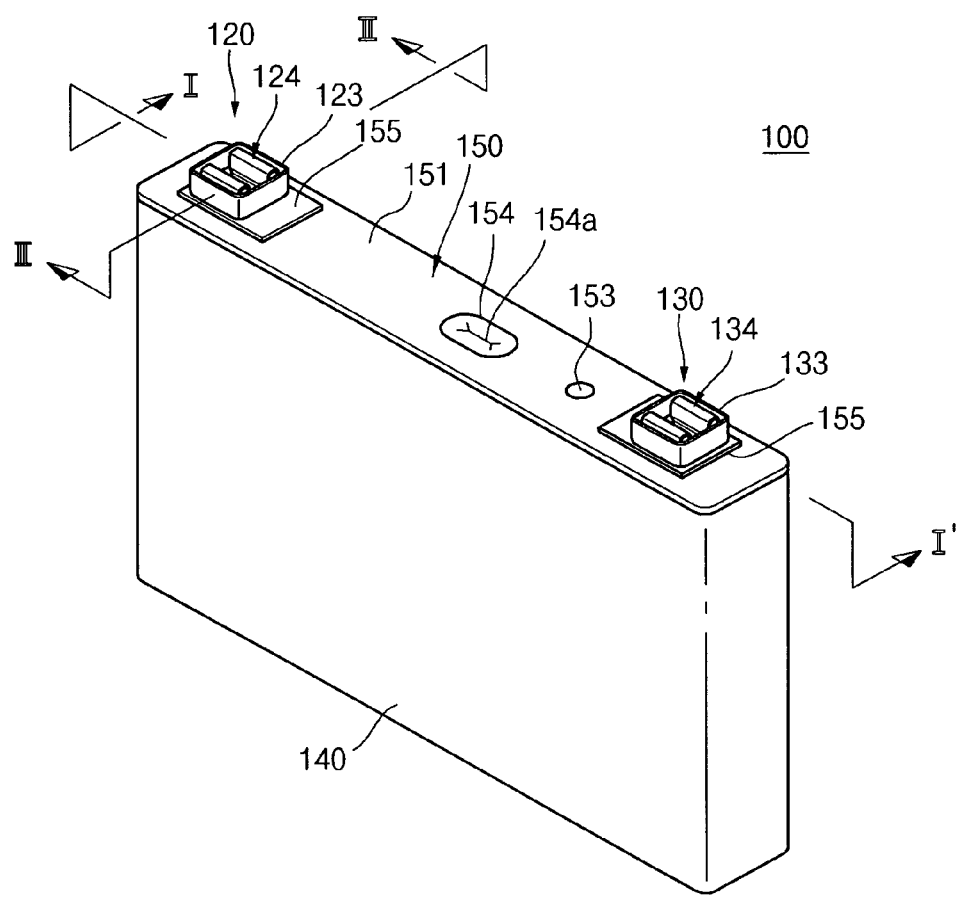
FIG. 1 illustrates a perspective view of a rechargeable battery according to an embodiment.

Korean Patent Application No. 10-2010-0112666, filed on Nov. 12, 2010, in the Korean Intellectual Property Office, and entitled: "Terminal of Rechargeable Battery, Method of Assembling the Terminal of Rechargeable Battery, Rechargeable Battery Module and Method of Assembling the Rechargeable Battery Module," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of features may be exaggerated for clarity of illustration. Like reference numerals refer to like elements throughout.

Figure 2:
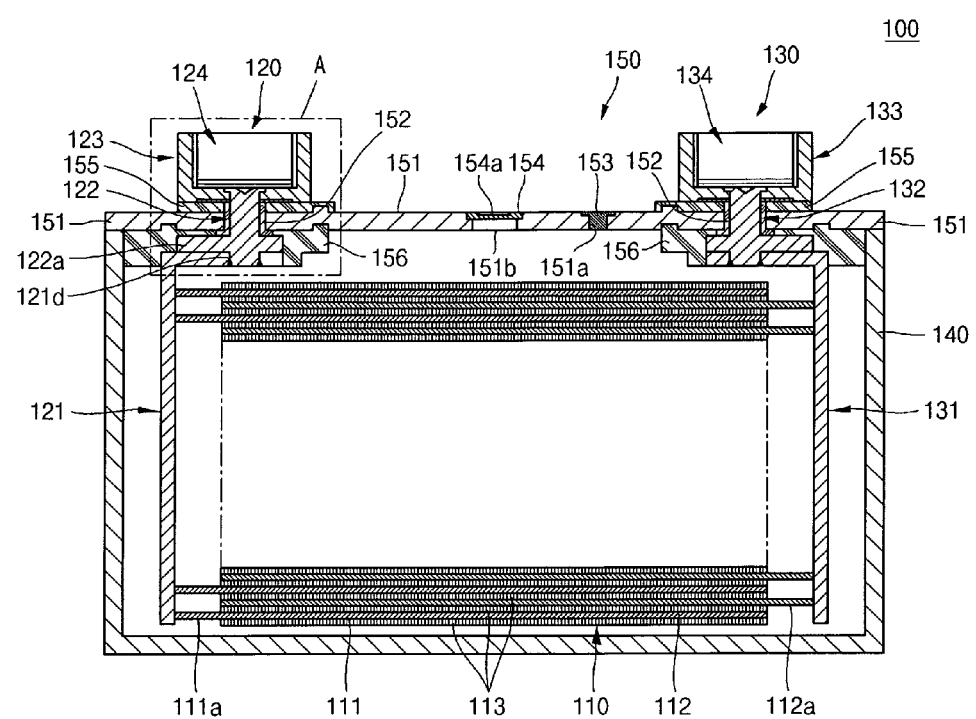
FIG. 2 illustrates a cross-sectional view of the rechargeable battery, taken along the line I-I' of FIG. 1.

FIG. 1 is a perspective view of a rechargeable battery according to an embodiment; FIG. 2 is a cross-sectional view of the rechargeable battery, taken along the line I-I' of FIG. 1; and FIG. 3 is a cross-sectional view of a terminal of the rechargeable battery, taken along the line II-II' of FIG. 1.

Figure 3:
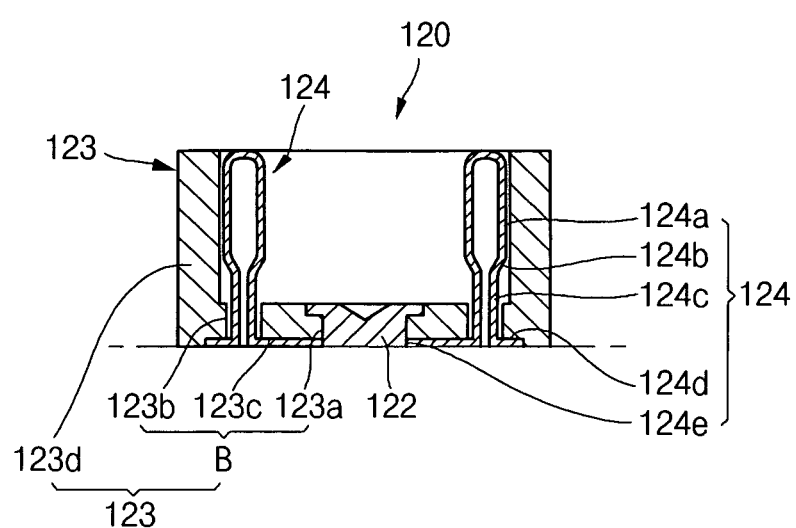
FIG. 3 illustrates a cross-sectional view of a terminal of the rechargeable battery, taken along the line II-II' of FIG. 1.

As shown in FIGS. 1 through 3, the rechargeable battery 100 according to the illustrated embodiment may include an electrode assembly 110, a first terminal 120, a second terminal 130, a case 140, and a cap assembly 150.

The electrode assembly 110 may be formed by winding or laminating a stacked structure having a first electrode plate 111, separator 113, second electrode plate 112 formed of a thin plate or layer. The first electrode plate 111 may serve as a negative electrode and the second electrode plate 112 may serve as a positive electrode, and vice versa.

The first electrode plate 111 may be formed by coating a first electrode active material made of graphite or carbon on a first electrode current collector formed of a metal foil made of, for example, copper or nickel, and may have a first electrode uncoated region 111a that is not coated with a first electrode active material. The first electrode uncoated region 111a corresponds to a path of current flow between the first electrode plate 111 and the outside of the first electrode plate 111. Materials of the first electrode plate 111 are not limited to those listed herein.

The second electrode plate 112 may be formed by coating a second electrode active material made of a transition metal oxide on a second electrode current collector formed of a metal foil made of, for example, aluminum, and may have a second electrode uncoated region 112a that is not coated with a second electrode active material. The second electrode uncoated region 112a corresponds to a path of current flow between the second electrode plate 112 and the outside of the second electrode plate 112. Materials of the second electrode plate 112 are not limited to those listed herein.

Polarities of the first electrode plate 111 and the second electrode plate 112 may be reversed.

The separator 113 may be positioned between the first electrode plate 111 and the second electrode plate 112 to prevent an electrical short and allow lithium ions to move. The separator 113 may be made of polyethylene, polypropylene, or a composite film of polyethylene and polypropylene. However, the material of the separator 113 is not limited to those listed herein.

A first terminal 120 and a second terminal 130 electrically connected to the first electrode plate 111 and the second electrode plate 112, respectively, may be coupled to both ends of the electrode assembly 110.

The electrode assembly 110 may be housed in the case 140 together with an electrolyte solution. The electrolytic solution may include a lithium salt such as $LiPF_6$ or $LiBF_4$ dissolved in an organic solvent such as EC (ethylene carbonate), PC (propylene carbonate), DEC (diethyl carbonate), EMC (ethyl methyl carbonate), or DMC (dimethyl carbonate). In addition, the electrolytic solution may be in a liquid, solid or gel state.

The first terminal 120 may be made of a metal or an equivalent thereof and may be electrically connected to the first electrode plate 111. The first terminal 120 may include a first current collecting plate 121, a first current collecting terminal 122, a first terminal plate 123 and a first contact spring 124.

The first current collecting plate 121 may contact the first electrode uncoated region 111*a* protruding to one end of the electrode assembly 110. The first current collecting plate 121 may be welded to the first electrode uncoated region 111*a*. The first current collecting plate 121 may be formed in a substantially '┌' shape (such as, for example, an inverted L shape, and may have a throughhole 121*d* formed thereon. The first current collecting terminal 122 may be fitted into the throughhole 121*d* to then be engaged therewith. The first current collecting plate 121 may be formed of, for example, copper or a copper alloy, but not limited thereto.

The first current collecting terminal 122 may pass through a cap plate 151 (described below), protrude upwardly and extend a predetermined length from the cap plate 151. The first current collecting terminal 122 may be electrically connected to the first current collecting plate 121 at a lower portion of the cap plate 151. The first current collecting terminal 122 may include a laterally extending flange 122*a* formed under the cap plate 151 to prevent the first current collecting terminal 122 from being dislodged from the cap plate 151 while upwardly protruding and extending a predetermined length from the cap plate 151. A portion of the first current collecting terminal 122, which is formed under the flange 122*a*, may be fitted into the throughhole 121*d* of the first current collecting plate 121 and welded thereto. In addition, a portion of the first current collecting terminal 122, which is formed on the flange 122*a*, may be fixed on the first terminal plate 123. The upper portion of the first current collecting terminal 122 may pass through a first contact spring 124 and the first terminal plate 123 (described below) and may be coupled thereto to then be riveted thereto. The first current collecting terminal 122 may be electrically insulated from the cap plate 151. The first current collecting terminal 122 may be made of at least one selected from, for example, copper, a copper alloy and equivalents thereof, but not limited thereto.

The first terminal plate 123 may include a terminal body B having a terminal throughhole 123*a*, a spring throughhole 123*b* and a fastening groove 123*c*, and a sidewall portion 123*d* upwardly extending from an edge of the terminal body B. The first terminal plate 123 may be formed in a substantially 'U' shaped cross-section, and may have the terminal throughhole 123*a* formed at its center to allow the first current collecting terminal 122 to pass therethrough for coupling. In addition, the spring throughhole 123*b* may be spaced apart from the terminal throughhole 123*a* and may be formed to allow the first contact springs 124 (described below) to pass therethrough for coupling. According to an embodiment, the first terminal plate may include two throughholes 123*b* spaced apart at opposite sides of the terminal throughhole such that two contact springs 124 pass through the first terminal plate 123. Further, the fastening groove 123*c* may be formed on a bottom surface 123*e* of the first terminal plate 123 to allow the first contact springs 124 to be coupled and fixed thereto in a horizontal direction. The first terminal plate 123 may be made of at least one selected from, for example, stainless steel, copper, copper alloy, aluminum, aluminum alloy, but not limited thereto. The first terminal plate 123 and the cap plate 151 may be insulated from each other.

The first current collecting terminal 122 and the first terminal plate 123 may be coupled and fixed to each other. The first current collecting terminal 122 may pass through the terminal throughhole 123*a* of the first terminal plate 123, and a top end of the first current collecting terminal 122 may be riveted thereto. The first current collecting terminal 122 and the first terminal plate 123 may be firmly coupled to each other mechanically and electrically. In addition, the first terminal plate 123 may be integrally formed with the first current collecting terminal 122.

Each of the first contact springs 124 may include a horizontal support portion 124*d*, a vertical bent portion 124*c*, a tilted bent portion 124*b*, and an annular portion 124*a*. The horizontal support portion 124*d* may be coupled and fixed to the fastening groove 123*c* of the first terminal plate 123 in a horizontal direction. The vertical bent portion 124*c* may extend and be vertically bent from the horizontal support portion 124*d* to then pass through the spring throughhole 123*b* for coupling. The tilted bent portion 124*b* and the annular portion 124*a* may extend from the vertical bent portion 124*c*, forming a substantially oval shape within the first terminal plate 123. A top surface of the annular portion 124*a* may be lower than a top surface of the first terminal plate 123, thereby allowing a bus bar (described below) to be easily inserted between the first contact springs 124. The first contact springs 124 may include a terminal hole aligning with the terminal throughhole 123*a* to allow the first current collecting terminal 122 to pass therethrough. The first contact springs 124 may be formed to be symmetrical to substantially opposite sides of the terminal throughhole 123*a*. The horizontal support portions 124*d* of the first contact springs 124 may be connected to each other, and the terminal throughhole 123*a* may be formed in the horizontal support portion 124*d*. However, the connection type of the horizontal support portion 124*d* is not limited to the illustrated type. The horizontal support portions 124*d* of the first contact springs 124 may be unconnected to each other. (Herein, the terms "spring" and "springs" may be used interchangeably to refer to a structure having one or more of the horizontal support portion 124*d*, vertical bent portion 124*c*, tilted bent portion 124*b*, and annular portion 124*a*. In particular, although a terminal 120 having two contact springs 124 is illustrated in the figures, it is to be understood that the number of contact springs may be more or less than what is shown.) The first contact springs 124 may form a permanent contact area when they electrically contact with a bus bar (not shown). The first contact springs 124 may be made of any one of phosphor bronze, beryllium copper, and yellow brass, but the material of the first contact springs 124 is not limited thereto.

The second terminal 130 may also be made of a metal or an equivalent thereof and may be electrically connected to the second electrode plate 112. The second terminal 130 may include a second current collecting plate 131, a second current collecting terminal 132, a second terminal plate 133 and a second contact spring 134. A shape of the second terminal 130 may be the same as that of the first terminal 120, and a description thereof will not be repeated. The second current collecting plate 131 and the second current collecting terminal 132 may be made of at least one of aluminum, an aluminum alloy and equivalents thereof, but the material of the second current collecting plate 131 and the second current collecting terminal 132 is not limited thereto. In addition, the second terminal plate 133 may be made of at least one of stainless steel, aluminum, an aluminum alloy, copper, a copper alloy and equivalents thereof, but the material of the second terminal plate 133 is not limited thereto.

The second terminal plate 133 may be electrically connected to the cap plate 151. Therefore, the case 140 and the cap plate 151 (described below) may have the same polarity as the second terminal 130, such as, for example, a positive polarity.

Like the first terminal plate 123, the second terminal plate 133 may include a terminal throughhole, a spring throughhole and a fastening groove. The second terminal plate 133 may be coupled to the second contact spring 134 coupled to the fastening groove and passing through the spring throughhole. As described above, since configurations and materials of the second terminal plate 133 and the second contact spring 134 may be the same as those of the first terminal plate 123 and the first contact spring 124, a detailed description thereof will not be repeated.

As described above, according to the illustrated embodiment, the current collecting terminals 122 and 132 may be coupled to the terminal plates 123 and 133 by riveting, respectively, and the contact springs 124 and 134 may be coupled to the terminal plates 123 and 133 so as to pass through the terminal plates 123 and 133, thereby forming a permanent contact region, that is, a current path, using elasticity of the contact springs 124 and 134, while improving the durability and mechanical and electrical reliability of the terminals.

In addition, in the illustrated embodiment, the current passing through the current collecting terminals 122 and 132 may be transferred to a bus bar through the contact springs 124 and 134 each having a relatively large sectional area, thereby extending a current path and reducing electric resistance of the terminals 124 and 134.

Further, in the illustrated embodiment, the contact springs 124 and 134 may be assembled with the terminal plates 123 and 133 in a simplified process, thereby minimizing a space for coupling the bus bar and improving the efficiency of the coupling process thereof.

The case 140 may be made of a conductive metal such as aluminum, an aluminum alloy, or nickel plated steel, and may be formed in a substantially hexahedral shape having an opening to allow the electrode assembly 110, the first terminal 120 and the second terminal 130 to be inserted and seated therein. Although the opening is not illustrated in FIG. 2, which shows a state in which the case 140 and the cap assembly 150 are coupled to each other, the opening corresponds to a portion in which the peripheral portion of the cap assembly 150 is opened. Since the inner surface of the case 140 may be insulated, the case 140 may be insulated from the electrode assembly 110, the first terminal 120, the second terminal 130 and the cap assembly 150.

The cap assembly 150 may be coupled to the case 140. Specifically, the cap assembly 150 may include a cap plate 151, a seal gasket 152, a plug 153, a safety vent 154, an upper insulation member 155 and a lower insulation member 156. The seal gasket 152, the upper insulation member 155 and the lower insulation member 156 may also be components of the first terminal 120 or the second terminal 130.

The cap plate 151 seals the opening of the case 140, and may be made of the same material as the case 140. For example, the cap plate 151 may be coupled to the case 140 by laser welding. As described above, since the cap plate 151 may have the same polarity as the second terminal 130, the cap plate 151 and the case 140 may also have the same polarity.

The seal gasket 152 may be formed between each of the first current collecting terminal 122 and the second current collecting terminal 132, and the cap plate 151 using an insulating material, thereby sealing regions between each of the first current collecting terminal 122 and the second current collecting terminal 132 and the cap plate 151. The seal gasket 152 prevents external moisture from infiltrating into the rechargeable battery 100 or prevents an electrolytic solution contained in the rechargeable battery 100 from flowing out.

The plug 153 may seal an electrolytic solution injection hole 151a of the cap plate 151, and the safety vent 154 may be installed in a vent hole 151b of the cap plate 151. A notch 154a may further be formed so as to be opened at a predetermined pressure.

The upper insulation member 155 may be formed between each of the first terminal plate 123 and the second terminal plate 133 and the cap plate 151. In addition, the upper insulation member 155 may be closely adhered to the cap plate 151. Further, the upper insulation member 155 may also be closely adhered to the seal gasket 152. The upper insulation member 155 may insulate each of the first terminal plate 123 and the second terminal plate 133 and the cap plate 151.

The lower insulation member 156 may be formed between each of the first current collecting plate 121 and the second current collecting plate 131 and the cap plate 151 to prevent electric shorts from occurring unnecessarily. The lower insulation member 156 may prevent electric shorts between the first current collecting plate 121 and the cap plate 151, and between the second current collecting plate 131 and the cap plate 151. The lower insulation member 156 may also be formed between each of the first current collecting terminal 122 and the second current collecting terminal 132 and the cap plate 151, thereby preventing electric shorts from occurring unnecessarily between each of the first current collecting terminal 122 and the second current collecting terminal 132 and the cap plate 151.

Figure 4A:
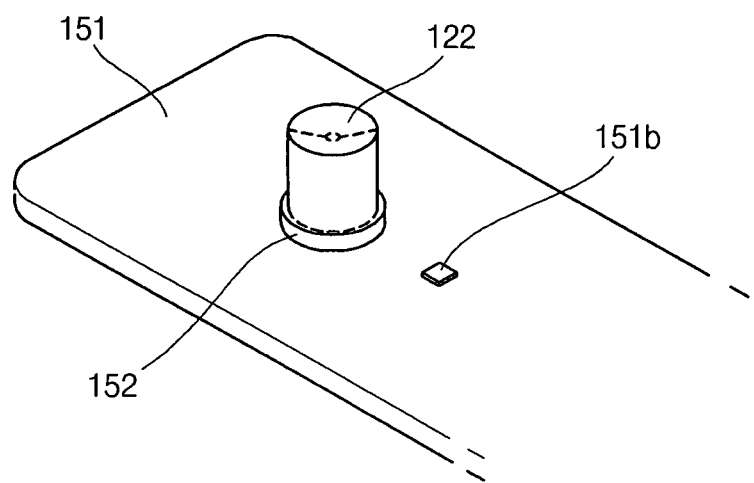
FIGS. 4A through 4C sequentially illustrate a method of assembling the terminal of a rechargeable battery shown in FIG. 1.
Figure 4B:
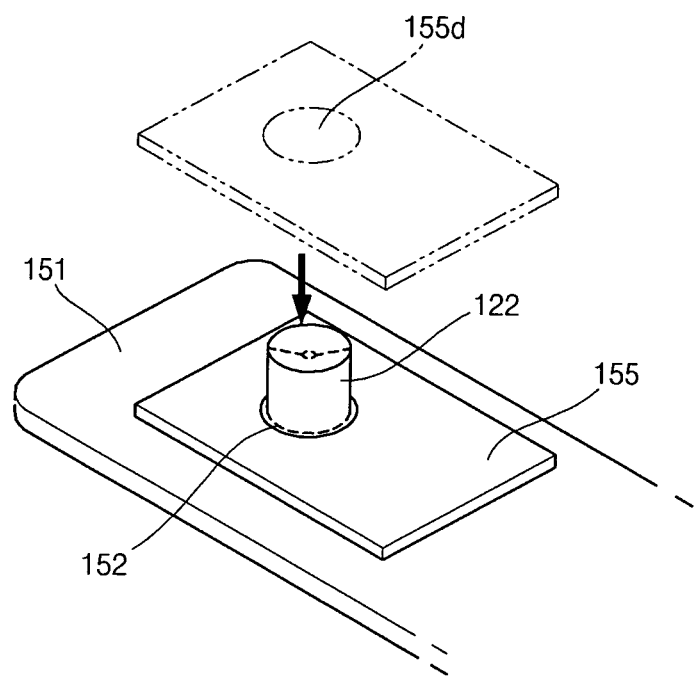
Figure 4C:
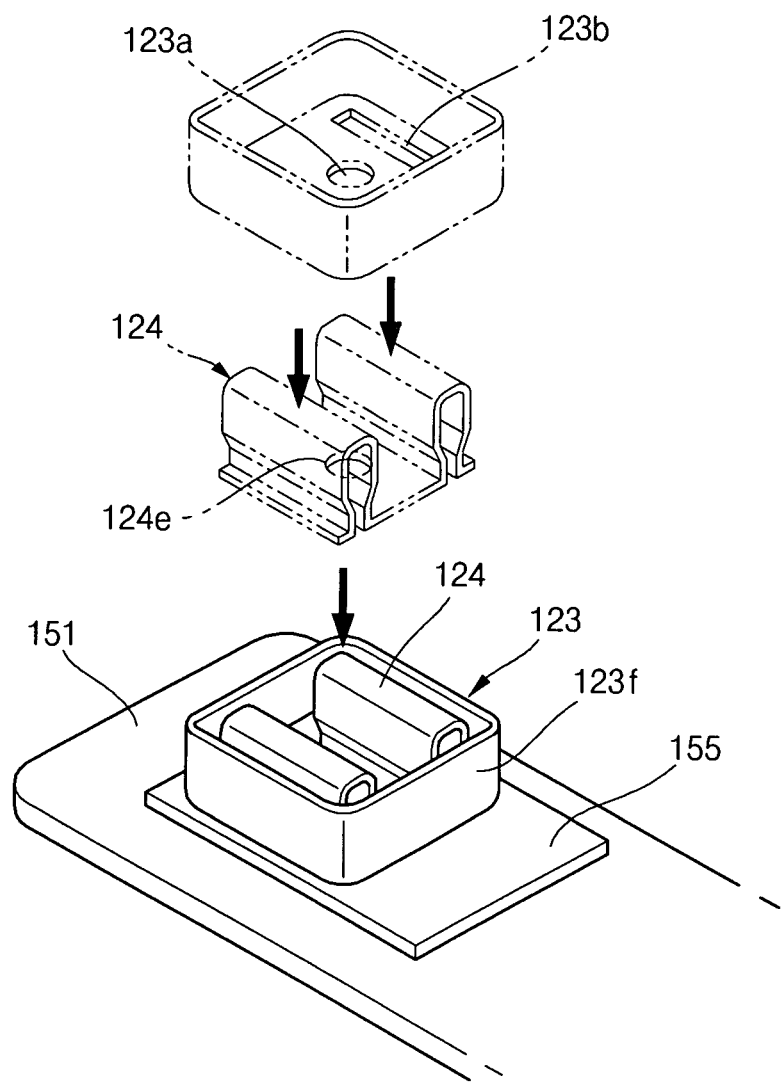

FIGS. 4A through 4C sequentially illustrate a method of assembling the terminal of a rechargeable battery shown in FIG. 1. In the following description, the invention will be described with regard to a first terminal because the first and second terminals may have the same configuration.

As shown in FIG. 4A, the first current collecting terminal 122 may be first coupled to the cap plate 151. The first current collecting terminal 122 may be electrically insulated from the cap plate 151 using the seal gasket 152. A protrusion 151b may be formed on a surface of the cap plate 151. The protrusion 151 may be engaged with a groove (not shown) of the upper insulation member 155, which will below be described.

As shown in FIG. 4B, the upper insulation member 155 may be coupled to the cap plate 151. The upper insulation member 155 may have a throughhole 155d formed to allow the first current collecting terminal 122 to pass therethrough for coupling.

The upper insulation member 155 may be seated on the cap plate 151 and may also be coupled to the protrusion 151b. The upper insulation member 155 may be prevented from rotating about the first current collecting terminal 122. The first current collecting terminal 122 may be in a state in which the first collecting terminal 122 passes through the upper insulation member 155 and upwardly extends by a predetermined length.

As shown in FIG. 4C, the first terminal plate 123 may be coupled to the first current collecting terminal 122. A throughhole 123a may be formed in a roughly central portion of the terminal body 123f of the first terminal plate 123, and the first current collecting terminal 122 may pass through the throughhole 123a for coupling. The first terminal plate 123 may engage the contact springs 124 coupled to the fastening groove (see 123c of FIG. 3) of the bottom surface of the first terminal plate 123. The contact springs 124 may pass through the spring throughholes 123b spaced apart from both sides of the terminal throughhole 123a.

As described above, in the illustrated embodiment, a contact area between the contact springs 124 and the bus bar may be extended using elasticity of the first contact springs 124, thereby forming a permanent current path through the current collecting terminal 122.

The first terminal plate 123 may be closely adhered to the upper insulation member 155. The first terminal plate 123 and the cap plate 151 may be electrically insulated from each other.

In addition, a top end of the first current collecting terminal 122 may be riveted using a riveting tool. The top end of the first current collecting terminal 122 may be firmly fixed to the first terminal plate 123, electrically and mechanically.

Figure 5:
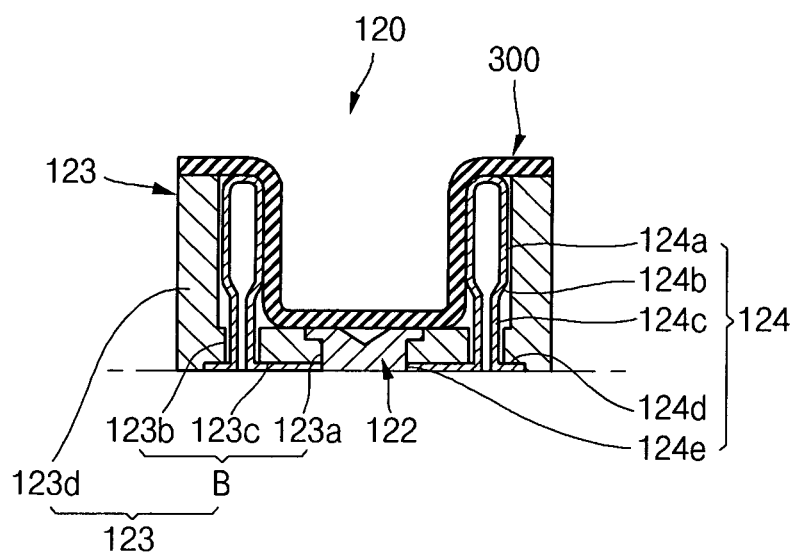
FIG. 5 illustrates a cross-sectional view of a terminal of a rechargeable battery coupled to a bus bar according to an embodiment.
Figure 6:
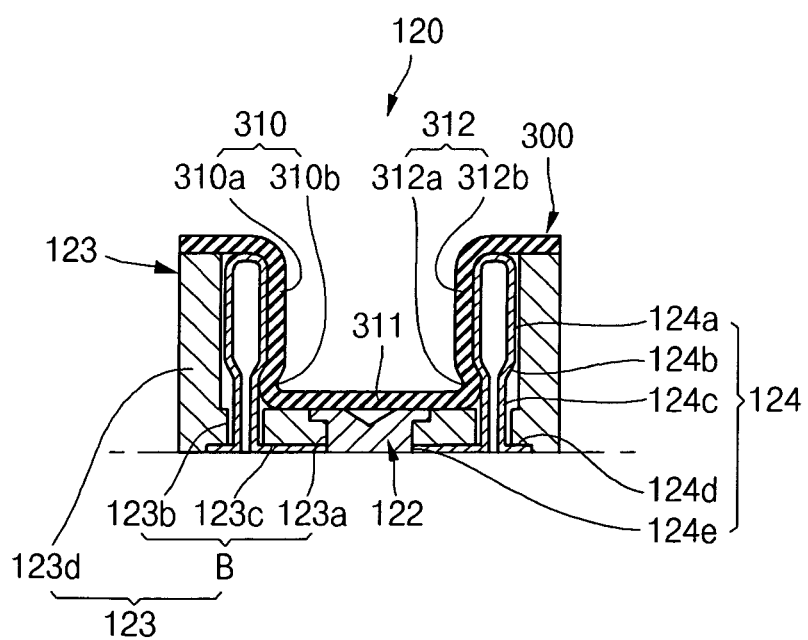
FIG. 6 illustrates a cross-sectional view of a terminal of a rechargeable battery coupled to a bus bar according to another embodiment.
Figure 7:
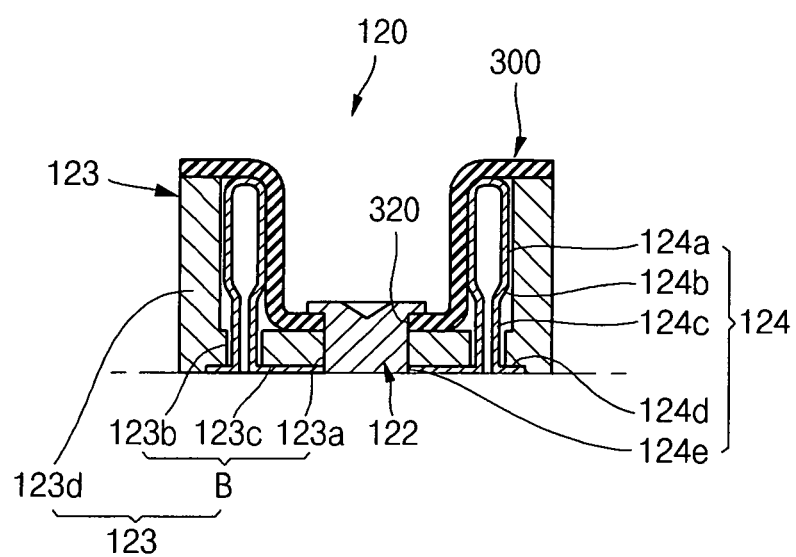
FIG. 7 illustrates a cross-sectional view of a terminal of a rechargeable battery coupled to a bus bar according to a further embodiment.

FIG. 5 is a cross-sectional view of a terminal of a rechargeable battery coupled to a bus bar according to an embodiment, FIG. 6 is a cross-sectional view of a terminal of a rechargeable battery coupled to a bus bar according to another embodiment, and FIG. 7 is a cross-sectional view of a terminal of a rechargeable battery coupled to a bus bar according to still another embodiment.

As shown in FIG. 5, in order to connect a current collecting terminal of the rechargeable battery and another current collecting terminal of an adjacent rechargeable battery to each other, a conductive bus bar 300 may be inserted into a top surface of a sidewall portion 123d of the terminal plate 123, top and side surfaces of the contact springs 124 positioned within the terminal plate 123, and a top surface of a terminal body B of the terminal plate 123 for coupling. A plurality of unit rechargeable batteries may be connected in series and/or parallel to each other by the conductive bus bar 300. The conductive bus bar 300 may be engaged and fixed with fastening holes (313 of FIG. 8) provided between some of the plurality of unit rechargeable batteries 100 through bolt portions (314 of FIG. 8).

The conductive bus bar 300 may be inserted between the terminal of each of the plurality of rechargeable batteries 100 and the contact springs 124 positioned within the terminal of each of the plurality of rechargeable batteries 100 for coupling. A current path may be increased to have a relatively large cross-sectional area using the current collecting terminal 122, the terminal plate 123 and the conductive bus bar 300, and reducing electrical resistance of terminal. As described above, the conductive bus bar 300 may be coupled to the contact springs 124 through the bolt portions 314 while being inserted into the contact springs 124, thereby establishing coupling between the conductive bus bar 300 and the terminal of each of the plurality of unit rechargeable batteries 100.

As shown in FIG. 6, a conductive bus bar 300 may have predetermined regions 310b and 312b coupled to portions of contact springs 124c and 124d passing through the terminal plate 123 by an interference fit. The conductive bus bar 300 may be firmly coupled to the contact spring 124 without using separate fixing devices such as bolt portions.

As shown in FIG. 7, a conductive bus bar 310 may have a throughhole 320 formed at a predetermined region contacting a bottom surface (311 of FIG. 6) of the terminal plate 123 to allow the current collecting terminal 122 to pass therethrough. The current collecting terminal 122 may be riveted through the throughhole 320. The conductive bus bar 310 may be firmly coupled to the contact spring 124 without using separate fixing devices such as bolt portions.

Figure 8:
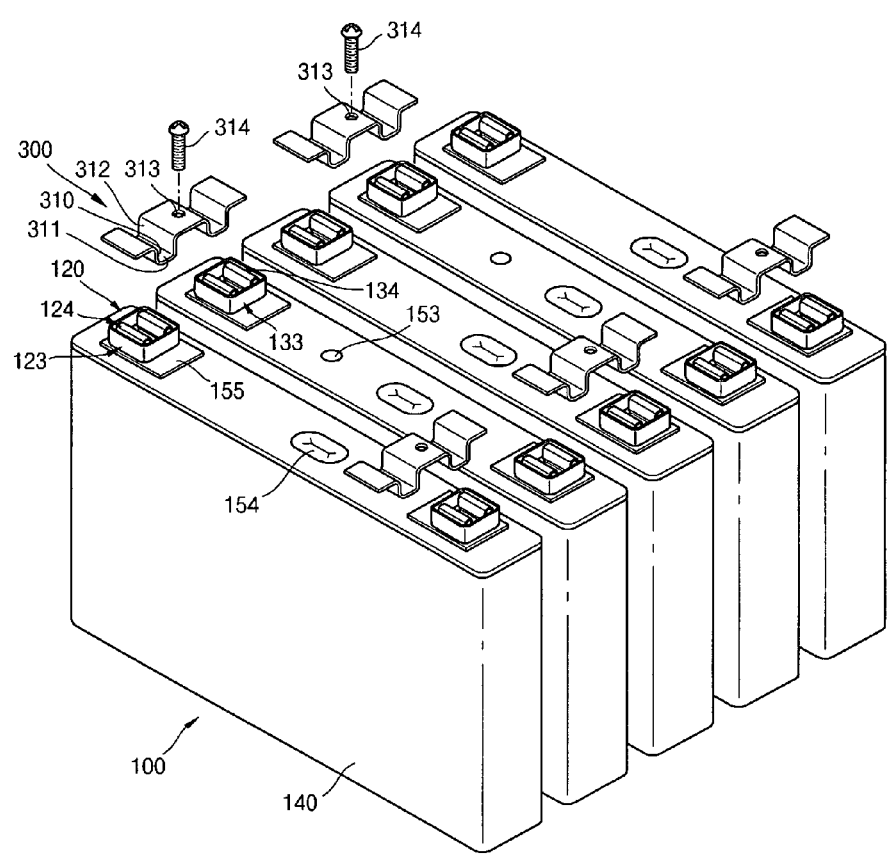
FIG. 8 illustrates a partially exploded perspective view illustrating a battery module and bus bars that are not yet attached to the terminals of the rechargeable batteries of the battery module.

FIG. 8 is a partially exploded perspective view illustrating a battery module and bus bars that are not yet attached to the terminals of the rechargeable batteries of the battery module.

As shown in FIG. 8, the conductive bus bar 300 is coupled to the contact terminal 120. The conductive bus bar 300 may be inserted between the contact springs 124 positioned at both sides of the terminal throughhole (122a of FIG. 3) in the terminal plate 123 for coupling. Therefore, the contact springs 124, each having a relatively large cross-sectional area, may be interposed between the current collecting terminal 122 and the conductive bus bar 300, thereby increasing a current path and reducing contact resistance.

The conductive bus bar 300 may have at least one fastening hole 313 formed at a region between a terminal of each of the plurality of rechargeable batteries and another terminal of an adjacent rechargeable battery. An insulator (not shown) may be disposed at the region between the terminal of each of the plurality of rechargeable batteries and the terminal of the adjacent rechargeable battery, and fastening grooves (not shown) may be formed at locations outside the insulator, corresponding to the at least one fastening hole 313. The bolt portions 314 may be engaged with the fastening grooves, thereby fixedly coupling the conductive bus bar 300.

The conductive bus bar 300 may be made of any one of stainless steel, aluminum, an aluminum alloy, copper, a copper alloy, and equivalents thereof, but the material of the conductive bus bar 300 is not limited thereof.

By way of summation and review, embodiments described herein may provide a terminal of a rechargeable battery, a method of assembling the terminal of a rechargeable battery, a rechargeable battery module and a method of assembling the rechargeable battery module, which can form a permanent contact area, that is, a current path, using elasticity of a contact spring while improving endurance and mechanical, electrical reliability of the terminal, by riveting a current collecting terminal to a terminal plate, and coupling a contact spring to pass through the terminal plate.

Embodiments may also provide a terminal of a rechargeable battery, a method of assembling the terminal of a rechargeable battery, a rechargeable battery module and a method of assembling the rechargeable battery module, which can extend a current path and reduce electric resistance of the terminal, by allowing the current to pass through a current collecting terminal to be transferred to a bus bar through a contact spring having a relatively large sectional area.

Embodiments may also provide a terminal of a rechargeable battery, a method of assembling the terminal of a rechargeable battery, a rechargeable battery module and a method of assembling the rechargeable battery module, which can reduce a possible occurrence of permanent or instantaneous electric shorts, by allowing the current passing through the current collecting terminal to be transferred to a bus bar through a contact spring having elasticity.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope as set forth in the following claims.

What is claimed is:

1. A terminal of a rechargeable battery having a case and an electrode assembly inside the case, the terminal comprising:

a current collecting terminal electrically connectable to the electrode assembly inside the case and for protrusion outwardly from the case;

a terminal plate for positioning outside the case, the terminal plate being coupled to the current collecting terminal; and a contact spring for positioning between the outside of the case and the terminal plate, the contact spring being coupled to the current collecting terminal, the contact spring having a predetermined region extending through the terminal plate.

2. The terminal as claimed in claim 1, wherein the current collecting terminal passes through the contract spring and the terminal plate and is riveted to the terminal plate.

3. The terminal as claimed in claim 1, wherein the current collecting terminal and the terminal plate are integrally formed.

4. The terminal as claimed in claim 1, wherein the terminal plate includes:

a terminal body including a terminal throughhole through which the current collecting terminal passes, a spring throughhole spaced apart from the terminal throughhole through which the contact spring passes, and a fastening groove on a bottom surface of the terminal body to which the contact spring is coupled; and an upwardly extending sidewall portion formed at a periphery of the terminal body.

5. The terminal as claimed in claim 4, wherein the contact spring includes:

a horizontal support portion coupled and fixed to the fastening groove of the first terminal plate in a horizontal direction;

a vertical bent portion extending upwardly and vertically bent from the horizontal support portion and passing through the spring throughhole for coupling;

a tilted bent portion extending from the vertical bent portion and upwardly bent from the spring throughhole in a tilted manner; and an annular portion extending from the tilted bent portion, forming an elongated oval shape within the terminal plate.

6. The terminal as claimed in claim 5 wherein the contact spring has a terminal hole through which the current collecting terminal passes.

7. The terminal as claimed in claim 6, wherein a pair of the contact springs are formed to be symmetrical at opposite sides of the terminal throughhole of the terminal body.

8. The terminal as claimed in claim 1, wherein the contact spring is made of any one of phosphor bronze, beryllium copper, and yellow brass.

9. The terminal as claimed in claim 5, wherein a top surface of the annular portion of the contact spring is lower than a top surface of the terminal plate.

10. A secondary battery having a terminal as claimed in claim 1, wherein an insulation member is interposed between the terminal plate and the case.

11. A method of assembling a terminal of a rechargeable battery comprising:

coupling a terminal plate to a current collecting terminal protruding outwardly from the case and riveting the current collecting terminal to the terminal plate; and coupling a contact spring having a predetermined region passing through the terminal plate to the current collecting terminal between the outside of the case and the terminal plate.

12. A method of assembling a terminal of a rechargeable battery comprising:

providing a terminal plate coupled to a current collecting terminal, the current collecting terminal protruding outwardly from the case and the terminal plate and the current collecting terminal being integrally formed; and coupling a contact spring to the current collecting terminal between the outside of the case and the terminal plate, the contact spring having a predetermined region passing through the terminal plate.

13. A rechargeable battery module having a plurality of rechargeable batteries positioned in parallel with each other to be electrically connected to each other, wherein each of the plurality of rechargeable batteries includes at least one terminal as claimed in claim 1, and a bus bar connects one current collecting terminal of the at least one terminal of one of the plurality of rechargeable batteries to another current collecting terminal of the at least one terminal of an adjacent rechargeable battery; the bus bar insertably engaging the contact spring positioned in the terminal plate.

14. The rechargeable battery module as claimed in claim 13, wherein the bus bar includes:

a fastening hole at the terminal of the rechargeable battery or at a region between the terminal of the rechargeable battery and another terminal of an adjacent rechargeable battery;

a fastening groove outside of the case, corresponding to the fastening hole; and a bolt portion engaged with the fastening hole through the fastening groove to couple the bus bar fixedly to the fastening groove.

15. The rechargeable battery module as claimed in claim 13, wherein the bus bar is coupled to portions of the contact springs passing through the terminal plate by an interference fit.

16. The rechargeable battery module as claimed in claim 13, wherein the bus bar includes a throughhole through which the current collecting terminal passes, and the current collecting terminal passing through the throughhole is riveted to the bus bar.

17. A method of assembling a rechargeable battery module having a plurality of unit rechargeable batteries positioned in parallel with each other to be electrically connected to each other, the method comprising:

providing the plurality of unit rechargeable batteries such that each of the plurality of rechargeable batteries includes at least one terminal including:

a current collecting terminal electrically connected to an electrode assembly inside a case and protruding outwardly from the case;

a terminal plate positioned outside the case and coupled to the current collecting terminal; and contact springs positioned between the outside of the case and the terminal plate and coupled to the current collecting terminal, the contact springs each having a predetermined region extending through the terminal plate, connecting a current collecting terminal of the rechargeable battery and another current collecting terminal of an adjacent rechargeable battery through a bus bar, wherein the bus bar is inserted between the contact springs.

18. The method as claimed in claim 17, wherein the bus bar includes at least one fastening hole at the terminal of the rechargeable battery or at a region between the terminal of the rechargeable battery and another terminal of an adjacent rechargeable battery; a fastening groove outside of the case, corresponding to the fastening hole; and a bolt portion engaged with the fastening hole through the fastening groove to couple the bus bar fixedly to the fastening groove.

19. The method as claimed in claim 17, wherein the bus bar has predetermined bus bar regions coupled to portions of the contact springs passing through the terminal plate by an interference fit.

20. The method as claimed in claim 17, wherein the bus bar includes a throughhole through which the current collecting terminal passes, and the current collecting terminal passing through the throughhole is riveted to the bus bar.

* * * * *